(12) United States Patent
Paul et al.

(10) Patent No.: US 11,879,861 B2
(45) Date of Patent: Jan. 23, 2024

(54) METHOD FOR MEASURING A CONDUCTIVITY OF A MEDIUM

(71) Applicant: Endress+Hauser Conducta GmbH+Co. KG, Gerlingen (DE)

(72) Inventors: Stefan Paul, Döbeln (DE); Andre Thieme, Borna (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 18 days.

(21) Appl. No.: 17/656,741

(22) Filed: Mar. 28, 2022

(65) Prior Publication Data

US 2022/0308002 A1 Sep. 29, 2022

(30) Foreign Application Priority Data

Mar. 26, 2021 (DE) ...................... 10 2021 107 765.6

(51) Int. Cl.
*G01N 27/07* (2006.01)

(52) U.S. Cl.
CPC .................... *G01N 27/07* (2013.01)

(58) Field of Classification Search
CPC ............ G01N 2030/645; G01N 27/02; G01N 27/028; G01R 27/02; G01R 31/2812; G01R 17/105

(Continued)

(56) References Cited

U.S. PATENT DOCUMENTS

| 4,751,466 | A | * | 6/1988 | Colvin | ................... | G01N 33/32 |
| | | | | | | 324/444 |
| 7,550,979 | B2 | * | 6/2009 | Zhou | ...................... | G01R 27/22 |
| | | | | | | 702/45 |

(Continued)

FOREIGN PATENT DOCUMENTS

| CN | 111122978 | A | * | 5/2020 | ............. | G01R 27/02 |
| CN | 110780122 | B | * | 2/2022 | ........... | G01N 27/045 |

(Continued)

OTHER PUBLICATIONS

English Translation of EP-3026430-A1 (Year: 2016).*
Phasengenaue Impedanzspektroskopie und-tomographie für geophysikalische Anwendungen, 2010, 149 pp.

*Primary Examiner* — Jermele M Hollington
*Assistant Examiner* — Sean Curtis
(74) *Attorney, Agent, or Firm* — Mark A. Logan; Endress+Hauser (USA) Holding, Inc.

(57) ABSTRACT

A method for measuring an electrical conductivity of a medium with a conductive conductivity sensor with four electrodes includes measuring a first impedance dependent on a first total impedance of the first voltage electrode and a medium layer adjacent to the first voltage electrode, measuring a second impedance dependent on a second total impedance of the second voltage electrode and a medium layer adjacent to the second voltage electrode, and making a conductivity measurement using an alternating electrical signal introduced into the medium via the first current electrode and measuring a potential difference between the first voltage electrode and the second voltage electrode. Based on the measured potential difference, the first impedance, and the second impedance a corrected potential difference is determined. Based on the corrected potential difference, a measured conductivity is determined.

10 Claims, 2 Drawing Sheets

(58) Field of Classification Search
USPC .................... 324/439, 448, 449, 693, 722
See application file for complete search history.

(56) References Cited

U.S. PATENT DOCUMENTS

| | | | | |
|---|---|---|---|---|
| 8,521,442 | B2 * | 8/2013 | Wang | G01N 27/06 |
| | | | | 702/30 |
| 9,329,226 | B2 * | 5/2016 | Paul | G01R 31/2829 |
| 9,354,193 | B2 * | 5/2016 | Platte | G01N 27/06 |
| 9,933,380 | B2 * | 4/2018 | Fouchard | A61B 5/0536 |
| 10,101,290 | B2 * | 10/2018 | Paul | G01R 27/28 |
| 2008/0297173 | A1 * | 12/2008 | Zhou | G01R 27/22 |
| | | | | 324/663 |
| 2014/0015540 | A1 * | 1/2014 | Paul | G01R 31/2829 |
| | | | | 324/537 |
| 2014/0152332 | A1 * | 6/2014 | Platte | G01N 27/06 |
| | | | | 324/713 |
| 2016/0153924 | A1 * | 6/2016 | Fouchard | G01N 27/026 |
| | | | | 324/647 |
| 2017/0052243 | A1 * | 2/2017 | Paul | G01N 27/06 |
| 2019/0011387 | A1 * | 1/2019 | Paul | G01R 27/28 |
| 2022/0011362 | A1 * | 1/2022 | Zhang | G01R 31/2829 |
| 2022/0308002 | A1 * | 9/2022 | Paul | G01N 27/07 |
| 2023/0142205 | A1 * | 5/2023 | Burkart | G01N 27/07 |
| | | | | 324/693 |

FOREIGN PATENT DOCUMENTS

| | | | | | |
|---|---|---|---|---|---|
| DE | 102012106384 | A1 * | 1/2014 | | G01R 31/2829 |
| DE | 102012106384 | A1 | 1/2014 | | |
| DE | 102015113922 | A1 * | 2/2017 | | G01N 27/06 |
| DE | 102018219952 | A1 * | 5/2020 | | G01N 27/10 |
| DE | 102021107765 | A1 * | 9/2022 | | G01N 27/07 |
| EP | 3026430 | A1 * | 6/2016 | | A61B 5/0536 |
| EP | 3220136 | A1 * | 9/2017 | | G01N 27/025 |
| WO | WO-2008025775 | A1 * | 3/2008 | | G01N 27/06 |
| WO | WO-2020104133 | A1 * | 5/2020 | | G01N 27/10 |

* cited by examiner

METHOD FOR MEASURING A CONDUCTIVITY OF A MEDIUM

CROSS-REFERENCE TO RELATED APPLICATION

The present application is related to and claims the priority benefit of German Patent Application No. 10 2021 107 765.6, filed on Mar. 26, 2021, the entire contents of which are incorporated herein by reference.

TECHNICAL FIELD

The present disclosure relates to a method that can be carried out by means of a conductive conductivity sensor for measuring a conductivity of a medium, and also to a conductive conductivity sensor that is designed to carry out conductive conductivity measurements by means of this method.

BACKGROUND

Conductive conductivity sensors are used in a variety of applications for measuring a conductivity of a medium.

Conductive conductivity sensors comprise, among other things, sensors designed as four-electrode sensors, such as are described, for example, in DE 10-2012-106 384 A1.

Four-electrode sensors comprise four electrodes immersed in the medium during measurement operation, two of which are used as current electrodes and two as voltage electrodes. An alternating signal, such as an AC voltage, is applied between the two current electrodes during measurement operation, and a corresponding alternating signal flow, for example an alternating current, is thereby introduced into the medium. The alternating signal flow through the medium located between the voltage electrodes causes a potential difference that is present between the voltage electrodes and is dependent on the conductivity of the medium, which potential difference is determined by a preferably currentless measurement by means of a measuring device connected to the voltage electrodes. The conductivity of the medium located between the voltage electrodes is determined from the measured potential difference via a previously determined conversion factor that is dependent on the geometry, the condition and the arrangement of the electrodes. The measured conductivity is here determined, for example, in the form of a specific resistance or a specific conductance of the medium.

In conductive conductivity measurements, the electrodes of the conductivity sensor are in direct contact with the medium during measurement. This direct contact leads to an electrochemical interaction of the electrodes with the medium, which generally leads to Helmholtz double layers forming on the electrodes. Helmholtz double layers comprise a Helmholtz layer adjacent to the respective electrode and carrying an excess charge, and a surface layer of the electrode with an opposite charge to the Helmholtz layer.

These electrochemical interactions result in medium layers directly adjacent to the electrodes acting in conjunction with alternating signals in each case like an additional electrical impedance that is upstream of the respective electrode and hereinafter referred to as layer impedance, which can under certain circumstances have a disadvantageous effect on the measurement accuracy achievable with the conductive conductivity sensor.

In the formation of Helmholtz double layers, these layer impedances can in particular be described at least approximately by a capacitor. Accordingly, the influence of the medium layers adjacent to the electrodes on conductivity measurement can within certain limits be reduced by the highest possible input impedance of the measuring device and the highest possible frequency of the alternating signal fed into the medium during measurement. However, such influence cannot be completely eliminated due to input impedance of the measuring device, which is then also still finite.

This is particularly problematic in the measurement of very high conductivities, since these measurements require a measurement that is as accurate as possible corresponding to the small potential differences between the voltage electrodes. The smaller the potential differences to be measured, the greater the voltages dropping across the changes impedances due to the finite input impedance of the measuring device and the finite frequency of the alternating signal in comparison with the potential difference to be measured.

This leads to a measurement error, which is greater the more the layer impedances of the two medium layers directly adjacent to the voltage electrodes differ from one another. Different layer impedances of these medium layers can be caused, for example, by different geometries of the voltage electrodes, contamination of electrode surfaces and/or deposits adhering to the electrodes.

In addition, the electrical properties of the medium layers adjacent to the electrodes can change during ongoing measurement operation. Possible causes for this are, for example, changes in electrochemical properties of the medium, changes in the surface properties of the electrodes occurring over time, and contamination and/or deposits forming over time on the electrode surfaces. This can lead to a temporal change in the achievable measurement accuracy, which regularly remains undetected.

A method for detecting malfunctions of conductive conductivity sensors is described in the aforementioned DE 10 2012 106 384 A1. With this method, an alternating voltage is applied to electrode pairs selected from the electrodes of the conductivity sensor, and an electrical measurand, such as a current flowing over the electrodes, a capacitance or an impedance, is measured. If the measurand lies within a first range, no malfunction will be detected. If the measured variable lies within a second range, a malfunction assigned to this range, which consists of, for example, the fact that the conductivity sensor is at least partially outside the medium, will be detected. If the measured variable lies within a third range, a malfunction assigned to this range, such as an electrode break or a tear in a supply line, will be detected.

However, the previously described measurement errors in particular possibly occurring in the measurement of very high conductivities are neither readily recognizable, nor can they be compensated.

SUMMARY

It is an object of the present disclosure to provide a method with which, in particular, even very high conductivities can be measured with high measurement accuracy by means of a conductive conductivity sensor.

To this end, the present disclosure comprises a method for measuring an electrical conductivity of a medium with a conductive conductivity sensor with electrodes that can be immersed into the medium, wherein the electrodes comprise a first current electrode, a second current electrode, a first voltage electrode and a second voltage electrode, with which:

the electrodes are immersed in the medium,
a first impedance dependent on a first total impedance of the first voltage electrode and of a medium layer adjacent to the first voltage electrode is measured,
a second impedance dependent on a second total impedance of the second voltage electrode and of a medium layer adjacent to the second voltage electrode is measured, and
at least one conductivity measurement is carried out, with which
an electrical alternating signal is introduced into the medium via the first current electrode and a potential difference at this time between the first voltage electrode and the second voltage electrode is measured,
on the basis of the measured potential difference, of the first impedance and of the second impedance, a corrected potential difference is determined, corrected with respect to a measurement error caused by voltages dropping over the first total impedance and the second total impedance during measurement of the potential difference, and
a measured conductivity is determined on the basis of the corrected potential difference.

The method offers the advantage that, via the first and the second impedances, a quantitative measure is available for possible differences between the voltages dropping on the input side over the first and the second total impedances during measurement of the potential difference between the voltage electrodes. This offers the advantage that a measurement error of the measured potential difference that is caused by the voltage drops that possibly differ from one another can be detected and corrected accordingly. On the basis of the corrected potential difference, in particular very high conductivities can thus also be determined with very high measurement accuracy.

A first development comprises a method with which:
the first impedance is measured, in that:
an alternating signal is introduced into the medium through a first signal path running via the first voltage electrode through the medium to the second current electrode,
a first electrical variable dependent on a path impedance of the first signal path is measured, and
the first impedance is determined on the basis of the first electrical variable, and
the second impedance is measured, in that:
an alternating signal is introduced into the medium through a second signal path running via the second voltage electrode through the medium to the second current electrode,
a second electrical variable dependent on a path impedance of the second signal path is measured, and
the second impedance is determined on the basis of the second electrical variable.

A development of the first development comprises a method with which the alternating signal introduced into the medium for measuring the first impedance and the alternating signal introduced into the medium for measuring the second impedance in each case have a frequency that is equal to a frequency of the alternating signal introduced into the medium during conductivity measurement.

Another development of the first development comprises a method, with which:
the alternating signal is applied to the first voltage electrode in the form of an AC voltage during measurement of the first impedance,
the first electrical variable is a current that flows via the first signal path and corresponds to a path impedance of the first signal path,
the alternating signal is applied to the second voltage electrode in the form of an AC voltage during measurement of the second impedance, and
the second electrical variable is a current that flows via the second signal path and corresponds to a path impedance of the second signal path.

Another development of the first development comprises a method, with which:
the path impedance of the first signal path comprises a resistance corresponding to the conductivity of the medium, and
the first impedance is determined such that it is equal to the path impedance determined on the basis of the first electrical variable minus a resistance value of the resistance determined by means of the conductivity sensor.

A further development of the first development comprises a method with which the second impedance is determined in such a way that it is equal to the path impedance of the second signal path determined on the basis of the second electrical variable.

A second development comprises a method with which:
at least once, periodically or repeatedly, a renewed measurement of the first impedance and of the second impedance is carried out, and
after each renewed measurement of the first impedance and of the second impedance, in each case at least one conductivity measurement is performed with which the corrected potential difference is determined on the basis of the first impedance last measured and the second impedance last measured.

A third development comprises a method with which the correction of the measured potential difference is carried out on the basis of predefined compensation data.

A development of the third development comprises a method with which the compensation data comprise compensation data by means of which a correction value that is dependent on a magnitude of the ratio for the correction of the measured potential difference is assigned to a ratio of the first impedance to the second impedance.

A further development of the third development comprises a method with which the compensation data:
comprise experimentally determined compensation data,
comprise specific compensation data based on reference measurements carried out with the conductivity sensor in one or more reference media having known conductivity and with voltage electrodes of different quality, different surface quality and/or different surface cleanliness, and/or
comprise numerically determined compensation data.

In addition, the present disclosure comprises a conductive conductivity sensor for carrying out the method according to the present disclosure, comprising
electrodes immersible in the medium, comprising the first current electrode, the second current electrode, the first voltage electrode and the second voltage electrode,
a signal generator for generating alternating signals,
a switching device connected to the signal generator, via which the signal generator is connected in a first switching state to the first current electrode, in a second switching state to the first voltage electrode and in a third switching state to the second voltage electrode, an impedance measuring device that is designed to:

measure the first impedance, while, by means of the signal generator and the switching device operated in the second switching state, an alternating signal is introduced into the medium via a first signal path running via the first voltage electrode through the medium to the second current electrode, and measure the second impedance, while, by means of the signal generator and the switching device operated in the third switching state, an alternating signal is introduced into the medium via a second signal path running via the second voltage electrode through the medium to the second current electrode, and a measuring device connected to the first voltage electrode and to the second voltage electrode, which is designed to:

measure a potential difference between the first voltage electrode and the second voltage electrode while an alternating signal is introduced via the first current electrode into the medium by means of the signal generator and the switching device being operated in the first switching state, determine the corrected potential difference on the basis of the measured potential difference, the first impedance and the second impedance, and determine and make available the measured conductivity on the basis of the corrected potential difference.

According to a development of the conductive conductivity sensor, the impedance measuring device comprises:

a measuring device arranged between the signal generator and the switching device, which is designed to measure a first electrical variable dependent on a path impedance of the first signal path and a second electrical variable dependent on a path impedance of the second signal path, and a signal processing device connected to the measuring device, which is designed to determine the first impedance on the basis of the first electrical variable and the second impedance on the basis of the second electrical variable.

BRIEF DESCRIPTION OF THE DRAWINGS

The present disclosure and its advantages will now be explained in more detail using the figures of the drawing in which an exemplary embodiment is shown; identical elements in the figures are provided with the same reference symbols.

DETAILED DESCRIPTION

The present disclosure relates to a method for measuring a conductivity of a medium that can be carried out by means of a conductive conductivity sensor, along with a conductive conductivity sensor, which is designed to carry out conductive conductivity measurements by means of this method.

Figure 1:
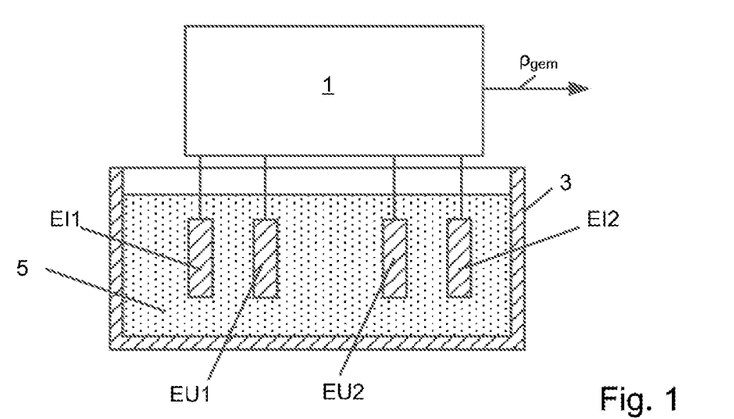
FIG. 1 shows a conductive conductivity sensor with electrodes immersed in a medium.

The conductivity sensor comprises electrodes that can be immersed in the medium and a measurement electronics unit 1 connected to the electrodes. FIG. 1 shows a measuring arrangement with which the electrodes of the conductivity sensor are immersed in a medium 5 located in a container 3. The conductivity sensor shown is designed as a four-electrode sensor, the electrodes of which comprise a first current electrode EI1, a second current electrode EI2, a first voltage electrode EU1 and a second voltage electrode EU2.

Figure 2:
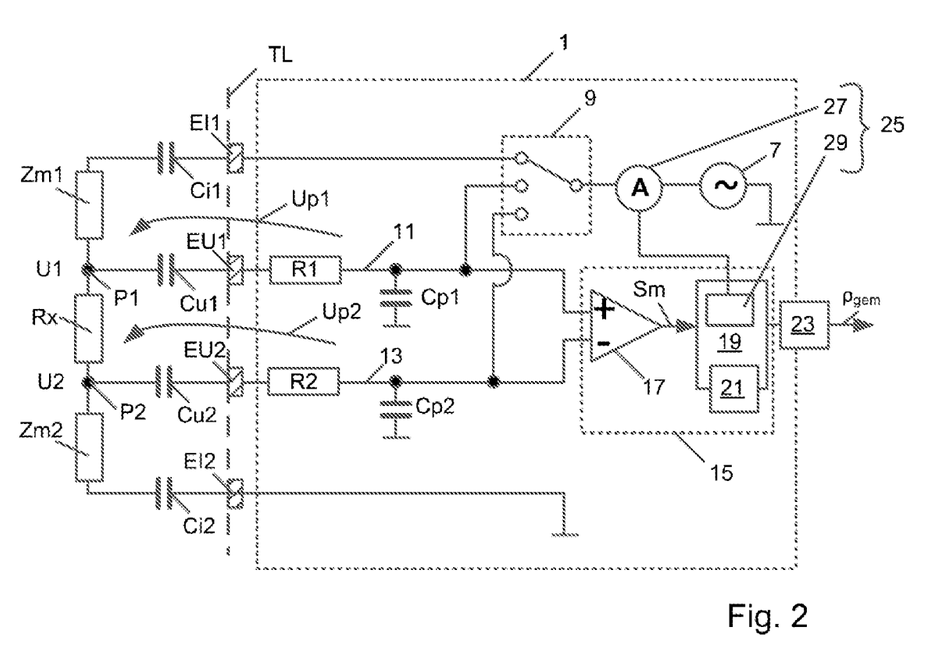
FIG. 2 shows a circuit diagram of the conductivity sensor of FIG. 1 together with an equivalent circuit diagram of electrical conditions developing on the medium side.

FIG. 2 shows a circuit diagram of the conductivity sensor of FIG. 1, together with an equivalent circuit diagram—shown on the left of a vertically extending dividing line TL shown in FIG. 2—of the electrical conditions forming on the medium on the medium side when the electrodes are immersed in the medium.

In the equivalent circuit diagram, the electrical properties of each of the medium layers directly adjacent to one of the electrodes are in each case represented by a layer impedance Ci1, Cu1, Cu2, Ci2 upstream of the respective electrode. With regard to the essentially capacitive properties of the Helmholtz double layers described above, the layer impedances Ci1, Cu1, Cu2, Ci2 are shown as capacitors in the equivalent circuit diagram shown in FIG. 2. Alternatively, the medium layers adjacent to the electrodes can be described by impedances having capacitive, inductive and/or ohmic components.

In the equivalent circuit diagram, the electrical conductivity of the medium 5 is represented by an ohmic resistor Rx that is arranged between the two voltage electrodes EU1, EU2 and corresponds to the conductivity of the medium 5. This resistor Rx is connected on one side via the layer impedance Cu1 upstream of the first voltage electrode EU1 to the first voltage electrode EU1 and parallel thereto via a first medium impedance Zm1 and the layer impedance Ci1 upstream of the first current electrode Eli to the first current electrode Eli. On the other side, the resistor Rx is connected via the layer impedance Cu2 upstream of the second voltage electrode EU2 to the second voltage electrode EU2 and parallel thereto via a second medium impedance Zm2 and the layer impedance Ci2 upstream of the second current electrode EI2 to the second current electrode EI2.

The measurement electronics unit 1 comprises a signal generator 7 for generating an alternating signal that can be introduced into the medium 5. An alternating voltage source, which outputs an alternating voltage of a prespecifiable amplitude and a prespecified or prespecifiable frequency, for example, is suitable as a signal generator 7.

A switching device 9, via which the signal generator 7 can optionally be connected to the first current electrode Eli, to the first voltage electrode EU1 or to the second voltage electrode EU2, is connected to the signal generator 7. An electronically controllable switch or a multiplexer is in particular suitable as switching device 9.

The selection of the respective electrode takes place, for example, by a corresponding selection and setting of a switching state of the switching device 9. Accordingly, the switching states in which the switching device 9 can be operated comprise a first switching state in which the signal generator 7 is connected via the switching device 9 to the first current electrode Eli, a second switching state in which the signal generator 7 is connected via the switching device 9 to the first voltage electrode EU1, and a third switching state in which the signal generator 7 is connected to the second voltage electrode EU2 via the switching device 9.

During conductivity measurement, the switching device 9 is operated in the first switching state shown in FIG. 2 and the alternating signal is fed into the medium via the first current electrode EIi. This leads to a voltage drop across the resistor Rx, which results in a potential difference ΔU(Rx):=U1−U2 between the two points P1, P2 at the potentials U1 and U2 that are plotted in the equivalent circuit diagram above and below the resistor Rx, which potential difference is dependent on the conductivity of the medium 5.

This potential difference ΔU(Rx) corresponding to the conductivity of the medium 5 is metrologically detected by means of a measuring device 15 connected via a first conduction path 11 to the first voltage electrode EU1 and via a second conduction path 13 to the second voltage electrode EU2. The measuring device 15 is designed to measure a potential difference between the first voltage electrode EU1 and the second voltage electrode EU2 and on the basis of the measured potential difference ΔUgem to determine and make available a measured conductivity ρgem of the medium 5.

The measuring device 15 shown in FIG. 2 comprises a measuring transducer 17, which generates a measurement signal Sm corresponding to the measured potential difference ΔUgem on the basis of input voltages applied on the input side via the two conduction paths 11, 13. For this purpose, a differential amplifier is suitable, for example, which on the output side provides the measurement signal Sm corresponding to the difference between input voltages applied thereto on the input side.

Furthermore, the measuring device 15 comprises a signal processing device 19 connected to the measuring transducer 17, such as, for example, a microprocessor, a microcontroller, a field-programmable (logic) gate arrangement known in the English-language technical field as a "field-programmable gate array (FPGA)", an application-specific integrated circuit referred to in the English-language technical field as an "application-specific integrated circuit (ASIC)" or a comparable digital device, which on the basis of the measurement signal Sm that is output by the measurement transducer 17 during conductivity measurement and that corresponds to the measured potential difference ΔUgem determines and makes available the measured conductivity ρgem of the medium 5.

Here, for example, such methods are carried out in such a way that the conductivity of the medium 5 corresponding to the resistor Rx is determined on the basis of the measured potential difference ΔUgem via a previously determined conversion factor, which is usually designated a cell constant in conductivity measurement technology and is dependent on the geometry, the condition and the arrangement of the electrodes and is stored for example in a memory 21 assigned to the signal processing device 19. The measured conductivity ρgem can be determined, for example, in the form of a specific resistance or a specific conductance of the medium 5. The measured conductivity ρgem is output, for example, via an interface 23 connected to the signal processing device 19, via which interface the measured conductivity ρgem is made available in a retrievable form and/or is output in the form of corresponding measured values and/or measurement signals.

During conductivity measurement, parasitic capacitors Cp1, Cp2 that are jointly responsible for the limited input impedance of the measurement electronics unit 1 and are coupled to the conduction paths 11, 13 result in a current flow via the first and second conduction paths 11, 13. The current flowing via the first conduction path 11 during conductivity measurement leads to a potential drop Up1 dependent on a first total impedance G1 of the first voltage electrode EU1 and the medium layer adjacent to the first voltage electrode EU1. This potential drop Up1 reduces the input voltage applied on the input side to the measuring device 15 via the first conduction path 11. Similarly, the current flowing via the second conduction path 13 during conductivity measurement leads to a potential drop Up2 dependent on a second total impedance G2 of the second voltage electrode EU2 and the medium layer adjacent to the second voltage electrode EU2. This potential drop Up2 reduces the input voltage applied on the input side to the measuring device 15 via the second conduction path 13.

In the example shown in FIG. 2, in each case one input resistor R1, R2 is used in each of the two conduction paths 11, 13. With this embodiment, the total impedances G1, G2 in each case at least jointly responsible for the voltage drops Up1, Up2 each comprise, in addition to the electrode impedance Zeu1 or Zeu2 of the respective voltage electrode EU1 or EU2 and the layer impedance Cu1 or Cu2 of the medium layer adjacent to the respective voltage electrode EU1 or EU2, the input resistor R1 or R2 used in the respective conduction path 11, 13.

If the two potential drops Up1, Up2 reducing the input voltages applied to the measuring device 15 are identical, the potential difference ΔUgem measured on the basis of the input voltages applied on the input side to the measuring transducer 17 will correspond to the potential difference ΔU(Rx):=U1−U2 dependent on the conductivity of the medium 5. However, if the potential drops Up1, Up2 are different, the measured potential difference ΔUgem will have a measurement error corresponding to the difference of the potential drops Up1, Up2.

In order to be able to compensate for these possibly present measurement errors, an impedance measurement method is carried out at least once or repeatedly, with which a first impedance Z1 dependent on the first total impedance G1 and a second impedance Z2 dependent on the second total impedance G2 is measured.

For measuring the first impedance Z1, such methods are, for example, such that an alternating signal is introduced into the medium 5 along a first signal path running via the first voltage electrode EU1 through the medium 5 to the second current electrode EI2 and a first electrical variable I1 dependent on a path impedance ZR1 of the first signal path is measured.

For this purpose, the signal generator 7 is connected to the first voltage electrode EU1 via the switching device 9 operated in the second switching state.

Figure 3:
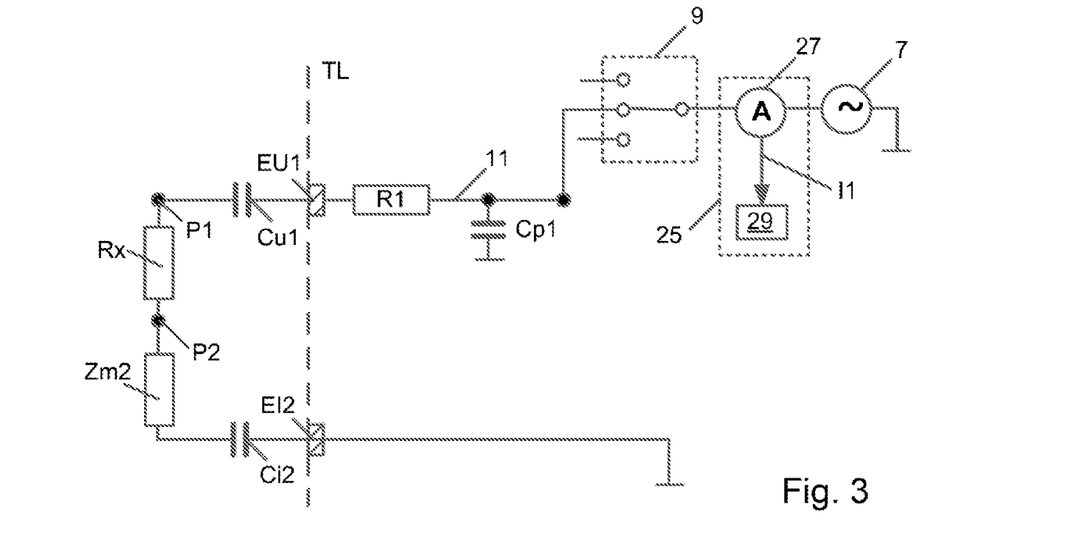
FIG. 3 shows a first signal path from FIG. 2 through which an alternating signal flows during a measurement of a first impedance, and FIG. 4 a second signal path from FIG. 2 through which an alternating signal flows during a measurement of a second impedance.

The introduction of the alternating signal via the first voltage electrode EU1 causes an alternating signal flow originating from the signal generator 7 along the first signal path, wherein the first signal path comprises the components shown in FIG. 3 of the circuit shown in FIG. 2 and of the equivalent circuit diagram shown in FIG. 2.

Under the generally justified assumption that a portion of the alternating signal flow flowing through the parasitic capacitor Cp1 is negligibly small, the path impedance ZR1 of the first signal path is essentially equal to a series circuit impedance of the series circuit in FIG. 3 comprising the input resistor R1, the electrode impedance Zeu1 of the first voltage electrode EU1, the layer impedance Cu1 upstream of the first voltage electrode EU1, the resistor Rx, and a supplementary impedance Za connected downstream of the resistor Rx. The following applies approximately: ZR1:=G1+Rx+Za; wherein for the first total impedance G1 the following applies: G1:=R1+Zeu1+Cu1.

All impedances connected downstream of the resistor Rx are combined in the supplementary impedance Za. In the example shown, the supplementary impedance Za consequently comprises the second medium impedance Zm2, the layer impedance Ci2 of the medium layer adjacent to the second current electrode EI2 and the electrode impedance Zei2 of the second current electrode EI2. The following applies here to the supplementary impedance Za: Za:=Zm2+ Ci2+Zei2.

A suitable first electrical variable I1 is, for example, a current flowing into the first signal path when an alternating voltage of known amplitude and predetermined frequency generated by the signal generator 7 is applied by the signal generator 7. This current corresponds to the path impedance ZR1 of the first signal path and is thus dependent on the first total impedance G1 contained in the path impedance ZR1.

In principle, the first impedance Z1 can be determined in such a way that it is equal to the path impedance ZR1 that can be determined on the basis of the measured first variable I1. In this case:

$$Z1:=ZR1:=G1+Rx+Za$$

However, this procedure is preferably only used when the resistance Rx of the medium is very low compared to the layer impedances Cu1, Cu2 of the medium layers adjacent to the two voltage electrodes EU1, EU2 and compared to the input resistors R1, R2.

Preferably, the first impedance Z1 is determined in such a way that it is equal to the path impedance ZR1 of the first signal path, that can be determined on the basis of the measured first variable I1, minus a resistance value Rgem of the resistor Rx. In this case:

$$Z1:=ZR1-Rgem=G1+Za$$

The resistance value Rgem required for this purpose is determined, for example, on the basis of a conductivity ρgem measured preferably before or after measurement of the first variable I1 by means of the conductivity sensor. Alternatively, the resistance value Rgem can be determined by feeding the alternating signal into the medium via the first current electrode EI1 and determining the resistance value Rgem on the basis of the potential difference ΔUgem measured during this time by means of the measuring transducer 17.

Analogous to the measurement of the first impedance Z1, in the case of measurement of the second impedance Z2, for example, is such a method whereby an alternating signal is introduced into the medium along a second signal path running via the second voltage electrode EU2 through the medium to the second current electrode EI2, a second electrical variable I2 dependent on a path impedance ZR2 of the second signal path is measured, and the second impedance Z2 is determined on the basis of the second electrical variable I2.

During measurement of the second impedance Z2, the signal generator 7 is connected to the second voltage electrode EU2 via the switching device 9 operated in the third switching state.

Figure 4:
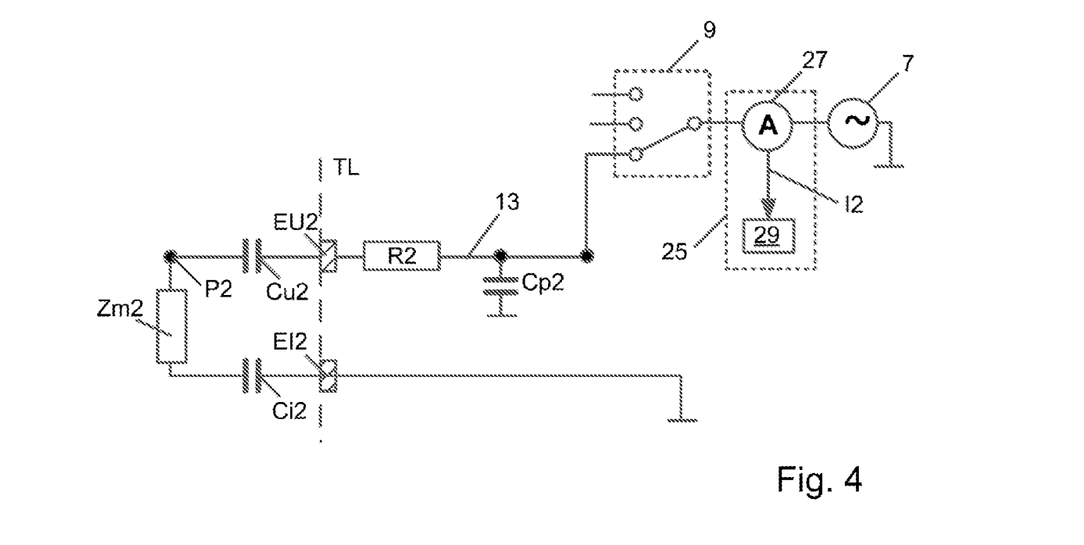

Introduction of the alternating signal via the second voltage electrode EU2 causes an alternating signal flow emanating from the signal generator 7 along the second signal path, wherein the second signal path comprises the components shown in FIG. 4 of the circuit shown in FIG. 2 and of the equivalent circuit diagram shown in FIG. 2. Under the assumption that is justified generally and also in the present case, that here a portion of the alternating signal flow flowing in this case via the parasitic capacitor Cp2 is negligibly small, the path impedance ZR2 of the second signal path is essentially equal to a series connection impedance of the input resistor R2 in FIG. 4, the electrode impedance Zeu2 of the second voltage electrode EU2, the layer impedance Cu2 upstream of the second voltage electrode EU2 and series connection including the supplementary impedance Za already described above. The following applies approximately: ZR2:=G2+Za, wherein the following applies to the second total impedance G2: G2:=R2+Zeu2+ Cu2.

Accordingly, suitable as a second electrical variable I2 is, for example, a current flowing into the second signal path when an alternating voltage of known amplitude and predetermined frequency generated by the signal generator 7 is applied by the signal generator 7. This current corresponds to the path impedance ZR2 of the second signal path and is thus dependent on the second total impedance G2 contained in the second path impedance ZR2.

In this case, the second impedance Z2 is determined, for example, in such a way that it is equal to the path impedance ZR2 of the second signal path that can be determined on the basis of the measured second variable I2. For the example shown in FIG. 4, the following results: Z2:=ZR2=G2+Za; where G2:=R2+Zeu2+Cu2 and $$Za:=Zm2+Ci2+Zei2.$$

Preferably, the alternating signal introduced via the first voltage electrode EU1 into the medium 5 for measuring the first impedance Z1 and the alternating signal introduced via the second voltage electrode EU2 into the medium 5 for measuring the second impedance Z2 have the same frequency. This frequency is preferably equal to a frequency prespecified for conductivity measurements to be carried out with the conductivity sensor. In this case, the alternating signals introduced via the first current electrode EI1 into the medium 5 during the conductivity measurements also have this prespecified frequency.

Measurement of the first and second impedances Z1, Z2 is carried out, for example, by means of an impedance measuring device 25 integrated in the conductivity sensor. The impedance measuring device 25 shown only as a possible example in FIG. 2 comprises a measuring circuit 27 arranged between the signal generator 7 and the switching device 9, and a signal processing device 29 connected thereto.

The measuring circuit 27 is designed to determine the first and the second electrical variables I1, I2 in each case on the basis of the alternating signal flow flowing into the respective signal path when the alternating signal is introduced. A measuring circuit 27 taking the form of an ammeter A or comprising an ammeter A or a measuring circuit 27, which measures a voltage dropping across a shunt resistor used between the signal generator 7 and the switching device 9, for example, is suitable for this purpose.

The signal processing device 29 is designed to determine the first impedance Z1 on the basis of the first variable I1 measured by the measuring circuit 27 and to determine the second impedance Z2 on the basis of the second electrical quantity I2 measured. As shown in FIG. 2, the function of the signal processing device 29 can be taken over, for example, by the signal processing device 19 connected to the measuring transducer 17.

The first impedance Z1 comprises the first total impedance G1, which is decisive for the potential drop Up1 caused by the current flowing via the first conduction path 11 during conductivity measurement, and the supplementary impedance Za. The second impedance Z2 comprises the second total impedance G2 that is decisive for the potential drop Up2 caused by the current flowing via second conduction path 13 during conductivity measurement, and the supplementary impedance Za. Since the supplementary impedance Za is equally contained in the first and second impedances Z1, Z2, a quantitative measure for possibly existing differences between the voltages dropping across the first and second total impedances G1, G2 during conductivity measurement is thus available via the first and the second impedances G1, G2.

If the first impedance Z1 is greater than the second impedance Z2, the first total impedance G1 will also be greater than the second total impedance G2. Consequently, the potential drop Up1 caused by the current flowing through the first conduction path 11 during conductivity measurement is greater than the potential drop Up2 caused by the current flowing through the second conduction path 13. This results in the measured potential difference ΔUgem being smaller than the potential difference ΔU(Rx) dependent on the conductivity of the medium.

If the first impedance Z1 is lower than the second impedance Z2, the first total impedance G1 will also be lower than the second total impedance G2. Consequently, the potential drop Up1 caused by the current flowing through the first conduction path 11 is smaller than the potential drop Up2 caused by the current flowing through the second conduction path 13. This results in the measured potential difference ΔUgem being greater than the potential difference ΔU(Rx) dependent on the conductivity of the medium.

Accordingly, the information available via the first and second impedances Z1, Z2 can be used to compensate for the measurement error in the conductivity measurement caused possibly by differences in the first and second total impedances G1, G2.

For this purpose, at least one conductivity measurement is carried out after the impedance measurement method, with which the electrical alternating signal is introduced into the medium via the first current electrode EI1 and, on the basis of the potential difference ΔUgem, the first impedance Z1 and the second impedance Z2 measured during this process in the manner described above, a potential difference ΔUkorr corrected with respect to voltages dropping over the first total impedance G1 and the second total impedance G2 during conductivity measurement is determined.

The corrected potential difference ΔUkorr is determined, for example, by means of compensation data. The compensation data are preferably determined in advance and stored in the memory 21 assigned to the signal processor 19.

In particular, compensation data, by means of which a ratio of the first impedance Z1 to the second impedance Z2 is assigned a correction value dependent on the magnitude of the ratio for correction of the measured potential difference ΔUgem, are suitable as compensation data.

The compensation data can be determined experimentally, for example, on the basis of reference measurements carried out using voltage electrodes EU1, EU2 of differing quality, especially differing surface quality and/or differing surface cleanliness, with the conductivity sensor in one or more reference media having a known conductivity. Alternatively or in addition thereto, however, numerically determined compensation data can also be used, in particular based on measured values and/or estimated values for the individual components shown in FIG. 2.

Following determination of the corrected potential difference ΔUkorr, the measured conductivity ρgem is determined on the basis of the corrected potential difference ΔUkorr. Here with the determination, and also with the provision and/or outputting of the measured conductivity ρgem, the procedure is for example in the manner described above, wherein the corrected potential difference ΔUkorr takes the place of the measured potential difference ΔUgem.

In the case of each conductivity measurement carried out after measurement of the first and second impedances Z1, Z2, the alternating signal introduced into the medium 5 via the first current electrode EI1 preferably has the prespecified frequency that is identical to the prespecified frequency of the alternating signal used for measuring the first and second impedances Z1, Z2.

Optionally, a renewed measurement of the first and second impedances Z1, Z2 is carried out at least once, periodically or repeatedly. In this case, after each renewed performance of the above-described impedance measurement method, at least one conductivity measurement is carried out in each case, with which the corrected potential difference ΔUkorr is determined on the basis of the first and second impedances Z1, Z2 last measured.

Repeated performance of the impedance measurement method offers the advantage that, since the last performance, changes that may have occurred in the first and second total impedances G1, G2 will thereby be detected and correction of the measured potential difference ΔUgem adjusted accordingly. A high measurement accuracy of the conductivity measurements is thus ensured even over very long periods of time.

The invention claimed is:

1. A method for measuring an electrical conductivity of a medium with a conductive conductivity sensor having four electrodes immersible in the medium, wherein the four electrodes include a first current electrode, a second current electrode, a first voltage electrode, and a second voltage electrode, the method comprising:
   immersing the four electrodes in the medium;
   measuring a first impedance dependent on an impedance of the first voltage electrode and a medium layer adjacent to the first voltage electrode by introducing an alternating signal into the medium via a first signal path running via the first voltage electrode, through the medium, and to the second current electrode, measuring a first electrical variable dependent on a path impedance of the first signal path, and determining the first impedance on the basis of the first electrical variable;
   measuring a second impedance dependent on an impedance of the second voltage electrode and a medium layer adjacent to the second voltage electrode by introducing an alternating signal into the medium via a second signal path running via the second voltage electrode, through the medium, and to the second current electrode, measuring a second electrical variable dependent on a path impedance of the second signal path, and determining the second impedance on the basis of the second electrical variable;
   introducing an electrical alternating signal into the medium via the first current electrode and measuring a potential difference between the first voltage electrode and the second voltage electrode;
   determining a corrected potential difference on the basis of the measured potential difference, the first impedance, and the second impedance, wherein the corrected potential difference corrects a measurement error caused by voltages dropping over the impedance of the first voltage electrode and the medium layer adjacent to the first voltage electrode and the impedance of the second voltage electrode and the medium layer adjacent to the second voltage electrode during measurement of the potential difference; and determining a measured conductivity on the basis of the corrected potential difference, wherein the alternating signal introduced into the medium for measuring the first impedance and the alternating signal introduced into the medium for measuring the second impedance each have a frequency equal to a frequency of the alternating signal introduced into the medium during conductivity measurement.

2. The method according to claim 1, wherein:
the alternating signal is applied to the first voltage electrode in the form of an AC voltage during measurement of the first impedance,
the first electrical variable is a current that flows via the first signal path and corresponds to a path impedance of the first signal path,
the alternating signal is applied to the second voltage electrode in the form of an AC voltage during measurement of the second impedance, and
the second electrical variable is a current that flows via the second signal path and corresponds to a path impedance of the second signal path.

3. The method according to claim 1, wherein:
the path impedance of the first signal path includes a resistor corresponding to the conductivity of the medium, and
the first impedance is determined such that it is equal to the path impedance of the first signal path determined on the basis of the first electrical variable minus a resistance value of the resistor determined by the conductivity sensor.

4. The method according to claim 1, wherein the second impedance is determined in such a way that it is equal to the path impedance of the second signal path determined on the basis of the second electrical variable.

5. The method according to claim 1, wherein:
at least once, periodically, or repeatedly a renewed measurement of the first impedance and the second impedance is carried out, and
after each renewed measurement of the first impedance and the second impedance, at least one conductivity measurement is carried out with which the corrected potential difference is determined on the basis of the first impedance last measured and the second impedance last measured.

6. The method according to claim 1, wherein the correction of the measured potential difference is performed on the basis of predefined compensation data.

7. The method according to claim 6, wherein the compensation data include compensation data via which a correction value that is dependent on a magnitude of the ratio for the correction of the measured potential difference is assigned to a ratio of the first impedance to the second impedance.

8. The method according to claim 6,
wherein the compensation data comprise experimentally determined compensation data;
specific compensation data based on reference measurements carried out with the conductivity sensor in one or more reference media having known conductivity and with voltage electrodes of differing quality, differing surface quality and/or differing surface cleanliness; and/or numerically determined compensation data.

9. A conductive conductivity sensor, comprising:
four electrodes immersible in a medium, the four electrodes including a first current electrode, a second current electrode, a first voltage electrode, and a second voltage electrode;
a signal generator for generating alternating signals;
a switching device connected to the signal generator, and via which the signal generator is connected in a first switching state to the first current electrode, in a second switching state to the first voltage electrode, and in a third switching state to the second voltage electrode;
an impedance measuring device, including:
a measuring device arranged between the signal generator and the switching device and designed to measure a first electrical variable dependent on a path impedance of the first signal path and a second electrical variable dependent on a path impedance of the second signal path, and
a signal processing device connected to the measuring device and designed to determine the first impedance on the basis of the first electrical variable and the second impedance on the basis of the second electrical variable,
wherein the impedance measuring device is configured to:
measure a first impedance, while, via the signal generator and the switching device operated in the second switching state, an alternating signal is introduced into the medium via a first signal path running via the first voltage electrode through the medium to the second current electrode; and
measure a second impedance while, via the signal generator and the switching device operated in the third switching state, an alternating signal is introduced into the medium via a second signal path running via a second voltage electrode through the medium to the second current electrode; and
a measuring device connected to the first voltage electrode and to the second voltage electrode, wherein the measuring device is designed to:
measure a potential difference between the first voltage electrode and the second voltage electrode while, via the signal generator and the switching device being operated in the first switching state, an alternating signal is introduced via the first current electrode into the medium;
determine a corrected potential difference on the basis of the measured potential difference, the first impedance, and the second impedance; and
determine and make available a measured conductivity on the basis of the corrected potential difference.

10. A conductive conductivity sensor, comprising:
four electrodes immersible in a medium, the four electrodes including a first current electrode, a second current electrode, a first voltage electrode, and a second voltage electrode;
a signal generator for generating alternating signals;
a switching device connected to the signal generator, and via which the signal generator is connected in a first switching state to the first current electrode, in a second switching state to the first voltage electrode, and in a third switching state to the second voltage electrode;
an impedance measuring device that is designed to:
measure a first impedance, while, via the signal generator and the switching device operated in the second switching state, an alternating signal is introduced into the medium via a first signal path running via the first voltage electrode through the medium to the second current electrode; and
measure a second impedance while, via the signal generator and the switching device operated in the third switching state, an alternating signal is introduced into the medium via a second signal path running via a second voltage electrode through the medium to the second current electrode; and a measuring device connected to the first voltage electrode and to the second voltage electrode, wherein the measuring device is designed to:

measure a potential difference between the first voltage electrode and the second voltage electrode while, via the signal generator and the switching device being operated in the first switching state, an alternating signal is introduced via the first current electrode into the medium;

determine a corrected potential difference on the basis of the measured potential difference, the first impedance, and the second impedance; and determine and make available a measured conductivity on the basis of the corrected potential difference, wherein the alternating signal introduced into the medium for measuring the first impedance and the alternating signal introduced into the medium for measuring the second impedance each have a frequency that is equal to a frequency of the alternating signal introduced into the medium during conductivity measurement.

* * * * *